United States Patent
McGregor et al.

(10) Patent No.: US 6,672,388 B2
(45) Date of Patent: Jan. 6, 2004

(54) PROCESS FOR THE CLEANING OF OIL AND GAS WELLBORES

(75) Inventors: William M. McGregor, Varese (IT); Dario Fomara, Novara (IT); Tullio Pellizzon, Paderno Dugnano (IT); Giuseppe Li Bassi, Gavirate (IT)

(73) Assignee: Lamberti USA, Inc., Hungerford, TX (US)

( * ) Notice: Subject to any disclaimer, the term of this patent is extended or adjusted under 35 U.S.C. 154(b) by 0 days.

(21) Appl. No.: 09/880,592

(22) Filed: Jun. 13, 2001

(65) Prior Publication Data

US 2003/0006040 A1 Jan. 9, 2003

(51) Int. Cl.⁷ .................................. E21B 37/00
(52) U.S. Cl. .................. 166/311; 507/927; 507/929
(58) Field of Search .................. 166/311, 312; 507/211, 261, 927, 929

(56) References Cited

U.S. PATENT DOCUMENTS

| | | | |
|---|---|---|---|
| 4,483,779 A | * 11/1984 | Llenado et al. | 252/135 |
| 4,663,069 A | 5/1987 | Llenado | 252/117 |
| 4,780,250 A | * 10/1988 | Urfer et al. | 252/547 |
| 5,458,197 A | 10/1995 | Chan | 166/304 |
| 5,962,399 A | * 10/1999 | Wulff et al. | 510/470 |
| 5,977,032 A | 11/1999 | Chan | 507/211 |
| 5,996,692 A | 12/1999 | Chan et al. | 166/263 |
| 6,087,320 A | * 7/2000 | Urfer et al. | 510/470 |
| 6,112,814 A | 9/2000 | Chan et al. | 166/304 |
| 6,289,989 B1 | * 9/2001 | Mueller et al. | 166/311 |

FOREIGN PATENT DOCUMENTS

| | | |
|---|---|---|
| EP | 0510564 B1 | 4/1996 |
| EP | 0510565 B1 | 6/1997 |
| WO | WO00/69261 | 11/2001 |

OTHER PUBLICATIONS

William E. Foxenberg et al.; *Displacement Technology To Ensure A Clean Well Bore*, Completion Technology, Hart's Petroleum Engineer International, Oct. 1998, pp. 23, 25–28.
Bernd Fabry et al.; *Alkyl Polyglycosides: An Overview of the Patent Situation, happi/* Aug. 1994, pp. 111–115.

* cited by examiner

Primary Examiner—William Neuder
(74) Attorney, Agent, or Firm—Madan, Mossman & Sriram, P.C.

(57) ABSTRACT

Disclosed is a process for cleaning wellbore walls, tubing or casings. The process is characterized by (a) preparing an aqueous surfactant composition containing from about 10% to 60% by weight of a mixture of surfactants, the mixture comprising from 10% to 50% by weight of an anionic derivative of an alkylpolyglycoside, from 35% to 80% by weight of an alkylpolyglycoside and from 5% to 25% by weight of an anionic derivative of a fatty alcohol, their balance being 100%; (b) diluting the aqueous surfactant composition in water to form a diluted aqueous surfactant composition and injecting the diluted aqueous surfactant composition into a wellbore containing drilling mud, oily residues or other undesirable deposits; (c) extracting from the wellbore the diluted aqueous surfactant composition containing the drilling mud, oily residues or other undesirable deposits; (d) removing the drilling mud, oily residues or other undesirable deposits from the diluted aqueous surfactant composition; and (e) optionally, re-using the diluted aqueous surfactant composition.

8 Claims, No Drawings

PROCESS FOR THE CLEANING OF OIL AND GAS WELLBORES

BACKGROUND OF THE INVENTION

1. Field of the Invention

The present invention relates to a process for the cleaning in turbulent flow regime of wellbore wall or tubing or casing. The present invention particularly relates to a process for the cleaning in turbulent flow regime of wellbore wall or tubing or casing using aqueous surfactant compositions.

2. Background of the Invention

An effective cleanout operation is important during drilling or workover of an oil or gas well, or for an acidizing treatment of a geological formation, or to secure the establishment of an effective bond between a cement composition and a wellbore wall or tubing or casing, in order to avoid undesirable results in oil and gas well operations. This is because, by way of example, an ineffective cleanout operation during drilling or workover of an oil well can result in damage where contamination and even plugging occurs at the formation from which there is intention to produce fluids.

Similarly, where an acidizing treatment of a formation is intended to increase the productivity of the formation, in the case that oil based contaminants are not removed from the wellbore zone adjacent to the formation interval, there can be a reduction in the effectiveness of the acidizing treatment. Moreover, poor cleaning of the wellbore wall, casing, liner or tubing string, can reduce the quality of the cement bonding during cementing operations, and therefore permit undesirable flow of fluids along the wellbore, or undesirable interconnection between separate formations zones, or undesirable fluid flow around the casing, or a failure to stabilize the casing in the wellbore. Remedial action for any of the above-mentioned problems, or resulting contamination of a formation interval, can incur substantial costs in both onshore and offshore well operations.

Foxenberg et al., describe in Hart's Petroleum Engineer International, October 1998, p23–28, that for cleaning regimes where a cleaning agent flows over a surface to be cleaned such as the displacement of a drilling fluid with a spacer fluid, turbulent flow usually has the advantage of increasing the cleaning efficiency. To promote a turbulent flow regime, those skilled in the art normally use commercially available cleaning agents, diluted with locally available water, which is viscosified by addition of suitable polysaccharide-based, or other, viscosifiers.

In recent years alkylpolyglycoside-based surfactants have increased in importance because they are made from renewable raw materials, they have an excellent environmental profile and their excellent surfactant properties. They have become especially important in detergent compositions, primarily for household cleaning products. Anionic derivatives of alkylpolyglycosides are known in literature, e.g. from EP 510564 and EP 510565. The advantages of alkylpolyglycoside-based surfactants have led to their use in other fields; WO 0069261, e.g., describes their application in compositions for agrochemical preparations. Synergism between the alkylpolyglycosides and the anionic surfactants is commonly exploited in the personal care and detergent sectors.

In practice, some weight ratios of binary mixtures of alkylpolyglycosides with anionic surfactants show synergic behavior for some fundamental surfactant properties, such as lowering critical micelle concentration, interfacial tension, and the like, for some important applicative parameters including increases in foaming, wetting, dishwashing performance, and the like. The use of combinations of alkylpolyglycosides with traditional (non alkylpolyglycoside-based) anionic surfactants are widely described, as reviewed by Fabry, et al., in Happi (August 1994 p, 111–115). It is possible to find descriptions of many compositions and processes related to the use of alkylpolyglycoside-based surfactants for well bore cleaning. For example, the following U.S. Pat. Nos. 5,977,032, 5,996,692, and 6,112,814 all disclose such applications.

Solutions of alkylpolyglycoside based synergic surfactant mixtures are effective in removing water and oil based drilling fluids, thread sealant and lubricating materials and oil based contaminants commonly found in wellbores; these include diesel oil, mineral oil, synthetic oils and crude oil and naturally occurring hydrocarbon substances. Alkylpolyglycoside based surfactant mixtures can be used as wetting, dispersing and/or emulsifying agents in caustic environments, such as in contact with cement slurries, remaining surface active at relatively high pH.

Chan, in U.S. Pat. No. 5,458,197, suggested the use of traditional anionics as cosurfactants in alkylpolyglycoside cleaning compositions for oil and gas well operations, but does not mention the use of the anionic derivatives of alkylpolyglycosides.

Notwithstanding the improvements in well cleanout operations described in these patents, there continues to be a need to provide a cleanout composition which maintains or improves on the characteristics needed for cleaning and that has improved toxicological and environmental properties, in line with legislation governing the use of chemicals in the oil and gas industry, and especially for offshore operations.

SUMMARY OF THE INVENTION

In one aspect, the present invention is a process for cleaning a wellbore wall, tubing or casing using a turbulent flow regime characterized by: (a) preparing an aqueous surfactant composition containing from about 10% to 60% by weight of a mixture of surfactants, the mixture comprising from 10% to 50% by weight of an anionic derivative of an alkylpolyglycoside, from 35% to 80% by weight of an alkylpolyglycoside and from 5% to 25% by weight of an anionic derivative of a fatty alcohol, their balance being 100%; (b) diluting the aqueous surfactant composition in water to form a diluted aqueous surfactant composition and injecting the diluted aqueous surfactant composition into a wellbore containing drilling mud, oily residues or other undesirable deposits; (c) extracting from the wellbore the diluted aqueous surfactant composition containing the drilling mud, oily residues or other undesirable deposits; (d) removing the drilling mud, oily residues or other undesirable deposits from the diluted aqueous surfactant composition; and (e) optionally, re-using the diluted aqueous surfactant composition.

In another aspect, the present invention is an aqueous surfactant composition for use in cleaning wellbore walls, tubing or casings comprising (a) from about 10% to 60% by weight of a mixture of surfactants, the mixture comprising from 10% to 50% by weight of an anionic derivative of an alkylpolyglycoside, (b) from 35% to 80% by weight of an alkylpolyglycoside and (c) from 5% to 25% by weight of an anionic derivative of a fatty alcohol, their balance being 100%.

In still another aspect, the present invention is a process for the preparation of these aqueous surfactant compositions characterized by: (a) reacting at 110–130° C. for about 2–3 hours a reducing saccharide with a fatty alcohol, the alcohol being in a 2 to 5 fold molar excess, forming a reaction mixture; (b) distilling off from the reaction mixture part of the unreacted fatty alcohol thus obtaining a mixture of alkylpolyglycoside and fatty alcohol containing from 3% to 15% of fatty alcohol; (c) esterifying the mixture of alkylpolyglycoside and fatty alcohol by adding to the mixture of alkylpolyglycoside and fatty alcohol at 110–130° C. over a period of 15–240 minutes a bi- or tri-carboxylic acid selected from the group consisting of citric acid, tartaric acid, malic acid, maleic acid, and mixtures thereof, forming an esterified mixture of alkylpolyglycoside and fatty alcohol; (d) diluting the esterified mixture of alkylpolyglycoside and fatty alcohol with water; and (e) neutralizing the resulting product.

In another aspect, the present invention is a process for the preparation of these aqueous surfactant compostions, characterized by to (a) reacting at 110–130° C. for about 2–3 hours a reducing saccharide with a fatty alcohol, the fatty alcohol being in a 2 to 5 fold molar excess, forming a reaction mixture; (b) distilling off from the reaction mixture part of the unreacted fatty alcohol thus obtaining a mixture of alkylpolyglycoside and fatty alcohol containing from 3% to 15% of fatty alcohol; (c) esterifying the mixture of alkylpolyglycoside and fatty alcohol by adding maleic anhydride to the mixture of alkylpolyglycoside and fatty alcohol at 110–130° C. over a period of 15–240 minutes; (d) diluting the esterified mixture of alkylpolyglycoside and fatty alcohol with water; and (e) sulfonating the resulting mixture.

DESCRIPTION OF PREFERRED EMBODIMENTS

In the preferred embodiment of the present invention the total concentration of surfactants in the aqueous surfactant composition is about 20% to 50% by weight and the mixture of surfactants comprises from 15% to 45% by weight of an anionic derivative of an alkylpolyglycoside, from 40% to 75% by weight of an alkylpolyglycoside and from 8% to 15% by weight of an anionic derivative of a fatty alcohol, their balance being 100%. Respectively, the anionic derivative of an alkylpolyglycoside, the alkylpolyglycoside and the anionic derivative of fatty alcohol of the present invention are compounds represented by the formulae I, II and III:

| I. | $[R\text{-}O\text{-}(G)_x]_n\text{-}(D)_y$ |
| II. | $R\text{-}O\text{-}(G)_x$ |
| III. | $R\text{-}O\text{-}D$ | where:
- R is an aliphatic group, saturated or unsaturated, linear or branched, having from 6 to 20 atoms of carbon, preferably from 8 to 16 atoms of carbon;
- G is a residue of a reducing saccharide, preferably of glucose, connected to R—O by means of an ethereal O-glycosidical bond;
- O is an oxygen atom;
- D is an acyl residue of sulfosuccinic acid or of a carboxylic acid selected from the group consisting of citric, tartaric, maleic and malic acid.
- n is a number between 1 and m−1, where m is the number of carboxylic groups in the acid that originates D;
- x is a number from 1 to 10, representing the average degree of oligomerization of G;
- y is a number from 1 to 10 representing the degree of average esterification of $(G)_x$.

According to a fundamental aspect of the present invention, the aqueous surfactant composition containing from about 10% to 60% by weight of a mixture of surfactants is directly prepared by a) reacting at 110–130° C. for about 2–3 hours a reducing saccharide, preferably glucose, with a fatty alcohol, the alcohol being in a molar excess of from 2 to 5 folds;

b) distilling off from the reaction mixture part of the unreacted fatty alcohol thus obtaining a mixture of alkylpolyglycoside and fatty alcohol containing from 3% to 15% by weight of fatty alcohol;

c) esterifying the mixture of alkylpolyglycoside and fatty alcohol thus obtained by adding to the reaction mixture at 110–130° C. over a period of 15–240 minutes maleic anhydride or a bi- or tri-carboxylic acid selected in the group consisting of citric acid, tartaric acid, maleic acid and malic acid;

d) diluting with water the cooled reaction mixture;

e) if maleic anhydride is used in step c), sulfonating the resulting mixture; or, if citric, tartaric, maleic or malic acid is used in step c), neutralizing the resulting mixture.

The aqueous surfactant composition of the present invention may advantageously comprise glycols, polyglycols or oligoglycols. Examples of glycols, polyglycols and oligoglycols include polyethylene glycol, polypropylene glycol, ethylene glycol, propylene glycol, diethylene glycol, dipropylene glycol, polyethylene glycol monomethylether, polypropylene glycol monomethylether, ethylene glycol monomethylether, propylene glycol monomethylether, diethylene glycol monomethylether, dipropylene glycol monomethylether, polyethylene glycol dimethylether, polypropylene glycol dimethylether, ethylene glycol dimethylether, propylene glycol dimethylether, diethylene glycol dimethylether, dipropylene glycol dimethylether. Preferred glycols according to the present invention are ethylene glycol, diethylene glycol or dipropylene glycol.

When considering surfactant compositions used in wellbore cleaning operations, particularly important is their toxicity to aquatic organisms, especially those low in the food chain, because of the possibility of accidental or willful discharge into the marine environment of the cleaning compositions, or of fluids contaminated with the cleaning compositions. For this reason, diagnostic toxicity testing of the aqueous surfactant compositions of the present invention were performed on the salt water crustacean, *Artemia Salina*. The aqueous surfactant compositions of the present invention exhibit an excellent cleaning performance while showing a clear eco-toxicological advantage over conventional compositions.

Cleaning agents, for oil and gas well use, are generally commercially supplied as relatively concentrated products and are normally diluted with locally available water before use. In the preferred embodiments of the invention, the aqueous surfactant compositions are diluted at from 1 to 10% by weight in viscosified water. The water may be hard or soft, or may very rarely be sea water when the supply of fresh water is severely limited.

Cleaning agents must meet specific performance requirements, specifically in terms of cleaning ability, compatibility with other substances used in the cleaning system and compliance with environmental legislation. The compositions of the present invention may also be applied in pipeline cleaning or pigging operations, for gravel pack or fracture cleaning fluids for wells, in spacer fluids, corrosion inhibitor fluids, wetting agents for cement slurries, as well as foaming agents and in other cleaning operations which are associated with hydrocarbon production and transport. These compositions are most useful for wellbore cleanout operations when the salinity and temperature involved with cleanout will not result in degradation of the composition or loss of its effectiveness.

The fluid remaining in a wellbore after completion of the drilling and casing process may well contain a significant amount of brine. Thus any cleaning solution used should be stable over a relatively wide range of temperatures, be tolerant of both caustic and acidic fluid compositions, and be tolerant over a relatively wide range of fluid salinity. The aqueous surfactant compositions in accordance with the present invention exhibit these properties in the conditions used in field applications.

It is known to those skilled in the art that cleaning regimes where a cleaning agent flows over a surface to be cleaned can be divided into laminar flow or turbulent flow regimes, where turbulent flow usually has an advantage of increasing the cleaning efficiency. To promote a turbulent flow regime, those skilled in the art often will use the cleaning agents, which are commercially supplied as concentrated products, and dilute them with locally available fresh water, which is viscosified by addition of commercial grades of suitable polysaccharide-based, or other, viscosifiers.

In a particular embodiment of the invention, it is generally preferred to add the present surfactant mixture to water viscosified with a natural polysaccharide, such as xanthan gum, in order to obtain a viscous aqueous composition suitable for cleaning under turbulent flow conditions.

The following examples are provided to illustrate the present invention. The examples are not intended to limit the scope of the present invention and they should not be so interpreted. Amounts are in weight parts or weight percentages unless otherwise indicated.

EXAMPLE 1

1a) Preparation of Composition 1

In a reaction vessel equipped with heating, cooling, stirrer, thermometer, a system of introduction of the reagents, such reaction vessel being connected both to a cooler provided of collector of water of reaction, and to a vacuum pump, the following components are added, under stirring: 930 g (5 mol) of a mixture of decyl alcohol, dodecyl alcohol, tetradecyl alcohol and hexadecyl alcohol with ratio 26:50:23,5:0,5, and 1.4 g of p-toluenesulphonic acid monohydrate. The temperature is set at 120° C. while the vacuum pump applies a pressure of 50–60 mm Hg. At a temperature of 120° C., 180 g (1 mol) of anhydrous glucose are added in portions in about 120 minutes. At the end of the last addition, the temperature of 120° C. is maintained for another 30 minutes, then the temperature is decreased to 50–60° C. and the neutralization is carried out with 1 g of a 30% solution of sodium hydroxide. The obtained product is an alkyl (C10–C12–C14–C16) polyglucoside containing about 75% of free fatty alcohol. By means of distillation on thin layer at 150° C. and at a pressure of 2 mmHg, the main part of unreacted fatty alcohol is distilled off, thus yielding an alkyl (C10–C12–C14–C16) polyglucoside containing about 12% of free fatty alcohol. The degree of glucose oligomerization is about 1.2.

In a reactor analogous to that described above, 148.4 g of the alkyl (C10–C12–C14–C16) polyglucoside containing about 12% of free fatty alcohol are introduced. The temperature is adjusted to 120° C. under stirring. At this temperature 22.6 g of maleic anhydride are added over a period of about 15 minutes. The reaction mixture is maintained at 120° C. until the acidity number reaches 76 (+/–3) mg/g of KOH. Then the reaction mixture is cooled down to 110–115° C. and a dilution is made with 244.4 g of water. The temperature is then adjusted to 80° C. and 29 g of sodium sulfite are added over a period of about 30 minutes.

The reaction mixture is mantained at 80° C. under stirring for 3 hours and then cooled down to room temperature (20° C.), thus obtaining about 444 g of an of an aqueous solution, where the dry fraction is 45% by weight and consists of about 40% of alkylpolyglucoside sulfosuccinic ester sodium salt, about 40% of alkylpolyglucoside and about 20% of fatty alcohol sulfosuccinic ester sodium salt (Composition 1)

1b) Evaluation of the Cleaning Efficiency of Composition 1

The Composition 1, diluted at 4% in water, is tested, in an essentially laminar flow cleaning situation, using the following method, performed at room temperature.

A rotating vertical steel cylinder about 4 cm in diameter is used to emulate drilling equipment and is immersed to a depth of about 4 cm into the test drilling fluid while rotating the cylinder at 600 rpm for one minute. The rotation is stopped and the cylinder removed from the drilling fluid and left stationary for another 30 seconds. The cylinder is then immersed to a depth of about 4 cm into a solution of the cleaning composition being tested while continuously rotating the cylinder at 200 rpm. At intervals of one minute after immersion the cylinder is inspected visually by the operator and the appearance of the cylinder is recorded using the following numerical scale:

5—no effect
4—some drilling fluid has been removed
3—more drilling fluid has been removed but the cylinder is still substantially covered with drilling fluid
2—the drilling fluid is partly removed from the cylinder
1—almost all the drilling fluid has been removed from the cylinder
0—the cylinder is free of drilling fluid and is now clean.

The test oil-based drilling fluid consists of a water-in-oil emulsion, where the oil is mineral oil, with the addition of barite as weighting agent, and chemical emulsifier, organophilic bentonite as viscosifier, and lime for pH control.

The same method is used to evaluate the cleaning efficiency of Composition 1 in turbulent flow regime by diluting it at 4% in water containing 0.8% of xanthan. The results of the tests are reported in Table 1 as the appearance of the cylinder.

TABLE 1

| | Appearance of the cylinder | | | | |
|---|---|---|---|---|---|
| Dilution of Composition 1 in: | After 1 minute | After 2 minutes | After 3 minutes | After 4 minutes | After 5 minutes |
| Water | 5 | 5 | 4 | 4 | 3 |
| Thickened Water | 2 | 1 | 0 | 0 | 0 |

1c) Toxicity Test on Composition 1

The $LC_{50}$ of Composition 1 is 14 mg/l, according to an Acute Toxicity Testing on *Artemia S.* performed on the salt water crustacean, *Artemia Salina* following the procedures devised by the Laboratory of Biological Research in Aquatic Pollution of Ghent University.

EXAMPLE 2

2a) Preparation of Composition 2

In a reaction vessel equipped with heating, cooling, stirrer, thermometer, a system of introduction of the reagents, such reaction vessel being connected both to a cooler and to a vacuum pump, the following components are added, under stirring: 930 g (5 mol) of a mixture of decyl alcohol, dodecyl alcohol, tetradecyl alcohol and hexadecyl alcohol with ratio 26:50:23,5:0,5, and 1.4 g of p-toluenesulphonic acid monohydrate. The temperature is set at 120° C. while the vacuum pump applies a pressure of 50–60 mm Hg. At a temperature of 120° C., 180 g (1 mol) of anhydrous glucose are added in portions in about 120 minutes. At the end of the last addition the temperature of 120° C. is maintained for another 30 minutes, then the temperature is decreased to 50–60° C. and the neutralization is carried out with 1 g of a 30% solution of sodium hydroxide. The obtained product is an alkyl (C10–C12–C14–C16) polyglucoside containing about 75% of free fatty alcohol. By means of distillation on thin layer at 150° C. and at a pressure of 2 mmHg, the main part of unreacted fatty alcohol is distilled off, thus yielding an alkyl (C10–C12–C14–C16) polyglucoside containing about 4% of free fatty alcohol. The degree of glucose oligomerization is about 1.2.

In a reactor analogous to that described above, 178.6 g of the alkyl (C10–C12–C14–C16) polyglucoside containing about 4% of free fatty alcohol are introduced. The temperature is adjusted to 120° C. under stirring; at this temperature 9.4 g of maleic anhydride are added over a period of about 15 minutes. The reaction mixture is maintained at 120° C. until the acidity number reaches 29 (+/−3) mg/g of KOH. Then the reaction mixture is cooled down to 110–115° C. and a dilution is made with 942.8 g of water. The temperature is than adjusted to 80° C. and 12 g of sodium sulfite, are added, over a period of about 30 minutes.

The reaction mixture is mantained at 80° C. under stirring for 3 hours and then cooled down to room temperature (20° C.), thus obtaining about 1143 g of an of an aqueous solution, where the dry fraction is 17.5% by weight and consists of about 17% of alkylpolyglucoside sulfosuccinic ester sodium salt, about 75% of alkylpolyglucoside and about 8% of fatty alcohol sulfosuccinic ester sodium salt (Composition 2).

2b) Evaluation of the Cleaning Efficiency of Composition 2

Composition 2 is diluted at 4% in water and tested, in an essentially laminar flow cleaning situation, by the method described in Example 1. The same method is used to evaluate the cleaning efficiency of Composition 2 in turbulent flow regime by diluting it at 4% in water containing 0.8% of xanthan. The results of the tests are reported in Table 2 as the appearance of the cylinder.

TABLE 2

| | Appearance of the cylinder | | | | |
|---|---|---|---|---|---|
| Dilution of Composition 2 in | After 1 minute | After 2 minutes | After 3 minutes | After 4 minutes | After 5 minutes |
| Water | 4 | 4 | 4 | 4 | 4 |
| Thickened Water | 2 | 2 | 1 | 0 | 0 |

2c) Toxicity Test on Composition 2

The $LC_{50}$ of Composition 2 is 69 mg/l, according to an Acute Toxicity Testing on *Artemia S.* performed on the salt water crustacean, *Artemia Salina* following the procedures devised by the Laboratory of Biological Research in Aquatic Pollution of Ghent University.

EXAMPLE 3

3a) Preparation of Composition 3

In a reaction vessel equipped with heating, cooling, stirrer, thermometer, a system of introduction of the reagents, such reaction vessel being connected both to a cooler and to a vacuum pump, the following components are added, under stirring: 930 g (5 mol) of a mixture of decyl alcohol, dodecyl alcohol, tetradecyl alcohol and hexadecyl alcohol with ratio 26:50:23,5:0,5, and 1.4 g of p-toluenesulphonic acid monohydrate. The temperature is set at 120° C. while the vacuum pump applies a pressure of 50–60 mm Hg. At a temperature of 120° C., 180 g (1 mol) of anhydrous glucose are added in portions in about 120 minutes. At the end of the last addition the temperature of 120° C. is maintained for another 30 minutes, then the temperature is decreased to 50–60° C. and the neutralization is carried out with 1 g of a 30% solution of sodium hydroxide. The obtained product is an alkyl (C10–C12–C14–C16) polyglucoside containing about 75% of free fatty alcohol. By means of distillation on thin layer at 150° C. and at a pressure of 2 mmHg, the main part of unreacted fatty alcohol is distilled off, thus yielding an alkyl (C10–C12–C14–C16) polyglucoside containing about 4% of free fatty alcohol. The degree of glucose oligomerization is about 1.2.

In a reactor analogous to that described above, 178.6 g of the alkyl (C10–C12–C14–C16) polyglucoside containing about 4% of free fatty alcohol are introduced. The temperature is adjusted to 120° C. under stirring; at this temperature 9.4 g of maleic anhydride are added over a period of about 15 minutes. The reaction mixture is maintained at 120° C. until the acidity number reaches 29 (+/−3) mg/g of KOH. Then the reaction mixture is cooled down to 110–115° C. and a dilution is made with 942.8 g of water. The temperature is then adjusted to 80° C. and 12 g of sodium sulfite, are added, over a period of about 30 minutes.

The reaction mixture is mantained at 80° C. under stirring for 3 hours and then cooled down to room temperature (20° C.). 170 g of diethyleneglycol are then added, always under stirring, thus obtaining about 1313 g of an of an aqueous solution, where the dry fraction is about 28% by weight and consists of 9% by weight of alkylpolyglucoside sulfosuccinic ester sodium salt, of 40% of alkylpolyglucoside, of 5% of fatty alcohol sulfosucccinic ester sodium salt and of 46% of diethyleneglycol (Composition 3).

3b) Evaluation of the Cleaning Efficiency of Composition 3

Composition 3 is diluted at 4% in water and tested, in an essentially laminar flow cleaning situation, by the method described in Example 1. The test on the Composition 3 in water is performed in an essentially laminar flow cleaning situation. The same method is used to evaluate the cleaning efficiency of Composition 3 in turbulent flow regime by diluting it at 4% in water containing 0.8% of xanthan. The results of the tests are reported in Table 3 as the appearance of the cylinder.

TABLE 3

| | Appearance of the cylinder | | | | |
|---|---|---|---|---|---|
| Dilution of Composition 3 in | After 1 minute | After 2 minutes | After 3 minutes | After 4 minutes | After 5 minutes |
| Water | 4 | 4 | 4 | 4 | 4 |
| Thickened Distilled Water | 2 | 1 | 0 | 0 | 0 |

3c) Toxicity Test on Composition 3

The LC$_{50}$ of Composition 3 is 79 mg/l, according to an Acute Toxicity Testing on *Artemia S.* performed on the salt water crustacean, *Artemia Salina* following the procedures devised by the Laboratory of Biological Research in Aquatic Pollution of Ghent University.

COMPARATIVE EXAMPLE 4

An aqueous surfactant composition, where the dry fraction is 38% by weight and consists of 24% by weight of alkyl (C10–C12–C14–C16) polyglucoside sulfosuccinic ester sodium salt with a degree of glucose oligomerization of 1.2, of 64% of alkyl (C10–C12–C14–C16) polyglucoside with a degree of glucose oligomerization 1.2, and of 12% of fatty alcohol sulfosucccinic ester sodium salt (Composition 4) was diluted at 1% in water and in artificial sea water and tested, in an essentially laminar flow cleaning situation, by the method described in Example 1. The results of the tests are reported in Table 4 as the appearance of the cylinder.

TABLE 4

| Dilution of Composition 4 in | Appearance of the cylinder | | | | |
|---|---|---|---|---|---|
| | After 1 minute | After 2 minutes | After 3 minutes | After 4 minutes | After 5 minutes |
| Water | 4 | 3 | 3 | 2 | 2 |
| Sea Water | 4 | 3 | 3 | 3 | 3 |

The LC$_{50}$ of Composition 4 is 21 mg/l, according to an Acute Toxicity Testing on *Artemia S.* performed on the salt water crustacean, *Artemia Salina* following the procedures devised by the Laboratory of Biological Research in Aquatic Pollution of Ghent University.

COMPARATIVE EXAMPLE 5

The commercial product USL WASH W, from Lamberti USA Inc., diluted at 4% in water and in artificial sea water, is tested, in an essentially laminar flow cleaning situation, by the method described in Example 1. The same method is used to evaluate the cleaning efficiency USL Wash W in turbulent flow regime by diluting it at 4% in water containing 0.8% of xanthan. The results of the tests are reported in Table 5 as the appearance of the cylinder.

TABLE 5

| Dilution of USL Wash W in | Appearance of the cylinder | | | | |
|---|---|---|---|---|---|
| | After 1 minute | After 2 minutes | After 3 minutes | After 4 minutes | After 5 minutes |
| Water | 5 | 5 | 5 | 4 | 4 |
| Thickened Water | 2 | 2 | 2 | 2 | 2 |

The LC$_{50}$ of USL Wash W is 29 mg/l, according to an Acute Toxicity Testing on *Artemia S.* performed on the salt water crustacean, *Artemia Salina* following the procedures devised by the Laboratory of Biological Research in Aquatic Pollution of Ghent University.

As it appears from the above examples, with turbulent flow, the Compositions 1, 2 and 3 give a dramatic increase in cleaning ability and are significantly improved with respect to the commercially available product of Example 5. These three compositions (Composition 1, 2 and 3) give the unique results of completely cleaning the test cylinder over all of the tests performed in thickened distilled water and are therefore to be considered as giving exceptional cleaning performance in their application to turbulent flow cleaning systems. Furthermore, Composition 2 and Composition 3 are clearly much less toxic than the commercially available product of Example 5. This demonstrates a clear eco-toxicological advantage for the compositions described herein, which combines with the advantages in cleaning performance.

Although preferred embodiments of the invention have been described in detail herein, those skilled in the art will realize that certain modifications may be made without departing from the scope and spirit of the invention as recited in appended claims.

What is claimed is:

1. A process for cleaning a wellbore wall, tubing or casing using a turbulent flow regime characterized by:
    a) preparing an aqueous surfactant composition containing from about 10% to 60% by weight of a mixture of surfactants, the mixture comprising from 10% to 50% by weight of an anionic derivative of an alkylpolyglycoside, from 35% to 80% by weight of an alkylpolyglycoside and from 5% to 25% by weight of an anionic derivative of a fatty alcohol, their balance being 100%;
    b) diluting the aqueous surfactant composition in water to form a diluted aqueous surfactant composition and injecting the diluted aqueous surfactant composition into a wellbore containing drilling mud, oily residues or other undesirable deposits;
    c) extracting from the wellbore the diluted aqueous surfactant composition containing the drilling mud, oily residues or other undesirable deposits; and
    d) removing the drilling mud, oily residues or other undesirable deposits from the diluted aqueous surfactant composition.

2. The process according to claim 1, wherein the aqueous surfactant composition of point a) is diluted at from 1% to 10% by weight in viscosified water.

3. The process according to claim 1, wherein the aqueous surfactant composition contains from about 20% to about 50% by weight of a mixture of surfactants.

4. The process according to claim 3, wherein the mixture of surfactants comprises from 15% to 45% by weight of an anionic derivative of an alkylpolyglycoside, from 40% to 75% by weight of an alkylpolyglycoside and from 8% to 15% by weight of an anionic derivative of a fatty alcohol, their balance being 100%.

5. The process according to claim 4, wherein respectively the anionic derivatives of alkylpolyglycosides, the alkylpolyglycoside and the anionic derivative of fatty alcohol are represented by the formulae I, II and III:

I. $[R-O-(G)_x]_n-(D)_y$

II. $R-O-(G)_x$

III. $R-O-D$ wherein:
    R is an aliphatic group, saturated or unsaturated, linear or branched, having from 6 to 20 atoms of carbon;
    G is a residue of a reducing saccharide, connected to R—O by means of an ethereal O-glycosidical bond;
    O is an oxygen atom;
    D is an acyl residue of a sulfosuccinic acid or of a carboxylic acid selected from the group consisting of citric acid, tartaric acid, maleic acid, malic acid, and mixtures thereof;
    n is a number between 1 and m-1, where m is the number of carboxylic groups in the acid that originates D;

x is a number from 1 to 10, representing the average degree of oligomerization of G; and y is a number from 1 to 10 representing the degree of average esterification of $(G)_x$.

6. The process according to claim 5, wherein in formulae I, II and III, R has from 8 to 16 atoms of carbon.

7. Process according to claim 5, wherein in formulae I and II, G is a residue of glucose.

8. The process of claim 1 additionally comprising e) re-using the diluted aqueous surfactant composition.

* * * * *